United States Patent [19]

Pierce et al.

[11] Patent Number: 5,639,110

[45] Date of Patent: Jun. 17, 1997

[54] TRAILING ARM SUSPENSION

[75] Inventors: William C. Pierce; Gregory A. Richardson, both of Muskegon, Mich.

[73] Assignee: NAI Neway, Inc., Muskegon, Mich.

[21] Appl. No.: 594,124

[22] Filed: Jan. 31, 1996

Related U.S. Application Data

[63] Continuation of PCT/US94/04109, Apr. 14, 1994.

[51] Int. Cl.[6] ............................................. B60G 7/00
[52] U.S. Cl. ............................................. 280/688; 280/711
[58] Field of Search ............................... 280/688, 711, 280/712, 713

[56] References Cited

U.S. PATENT DOCUMENTS

| | | | |
|---|---|---|---|
| 3,547,215 | 12/1970 | Bird | 280/689 |
| 4,427,213 | 1/1984 | Raidel, Jr. | 280/711 |
| 4,566,719 | 1/1986 | Van Denberg | 280/711 |
| 5,002,305 | 3/1991 | Raidel | 280/711 |
| 5,037,126 | 8/1991 | Gottschalk et al. | 280/688 |
| 5,127,668 | 7/1992 | Raidel | 280/711 |

FOREIGN PATENT DOCUMENTS

| | | |
|---|---|---|
| 0 323 414 | 7/1989 | European Pat. Off. . |
| 82.194 | 3/1964 | France . |
| 2 552 374 | 3/1985 | France . |
| 2 526 721 | 11/1983 | Germany . |
| 87 07 020.0 | 6/1987 | Germany . |

*Primary Examiner*—Kenneth R. Rice
*Attorney, Agent, or Firm*—Varnum, Riddering, Schmidt & Howlett

[57] ABSTRACT

A trailing arm suspension (10) has a trailing arm (12) comprising a central rib (32) to which opposing U-shaped side plates (52, 54) are welded. The central rib (32) and the opposing side plates (52, 54) have congruent semicircular recesses (34, 38) disposed at one end of the trailing arm to define a first seat (55) for receiving a mounting collar (36) to mount the one end of the trailing arm to a hanger bracket (16). The central rib (32) and opposing side plates (52, 54) have further congruent semicircular recesses (56, 58) that define a second seat (57) in which is mounted a cast member (40) for mounting an axle (24). A portion of the central rib extends above the opposed side plates and defines a shock absorber mount (42). The other end of the central rib (32) has a rectangular recess (46) for receiving an end shaft (48) to mount a transverse beam.

27 Claims, 4 Drawing Sheets

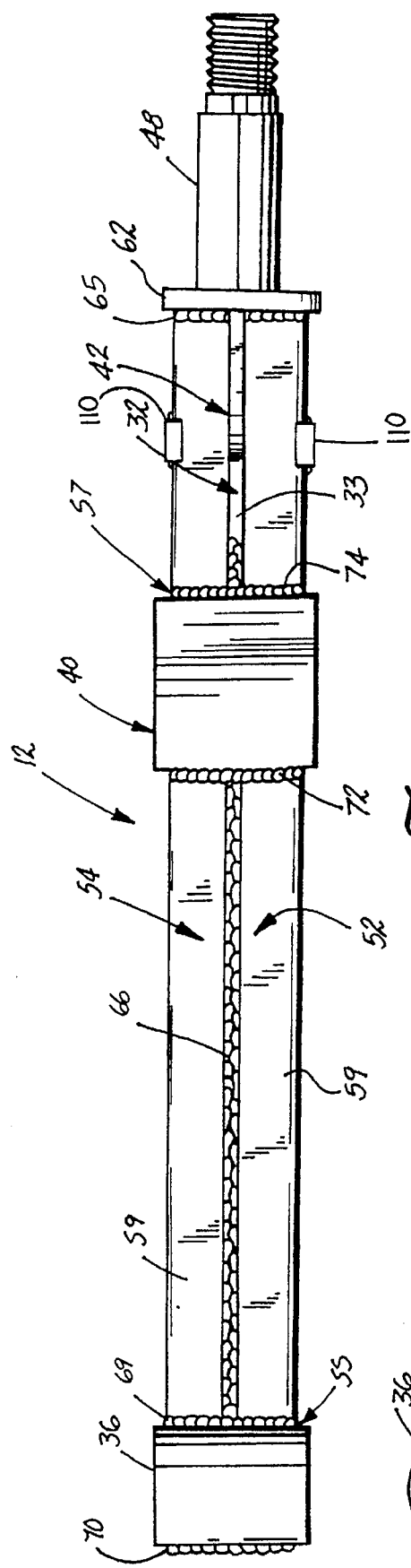
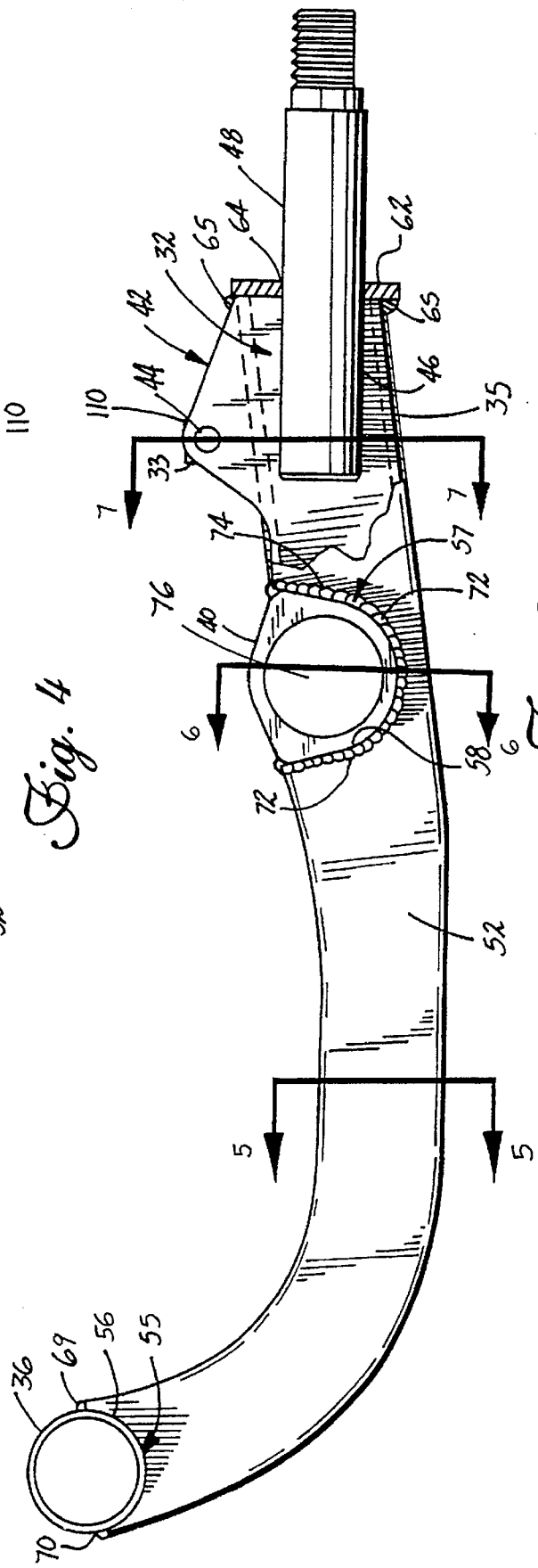

TRAILING ARM SUSPENSION

BACKGROUND OF THE INVENTION

This is a continuation of International Application No. PCT/US94/04109, with an international filing date of Apr. 14, 1994.

1. Field of the Invention

This invention relates to a trailing arm structure in a trailing arm suspension for heavy duty vehicles.

2. Description of Related Art

Heavy-duty vehicle suspension systems are typically characterized by high-strength components, which are relatively heavy. It is desirable to reduce the weight of the suspensions without loss of strength in order to more efficiently carry loads and lower fuel costs.

Trailing arm suspensions are well known. Such suspensions typically comprise a frame bracket, also known as a hanger bracket, that is secured to the frame on each side of the vehicle and a trailing arm, pivotally mounted at one end to each frame bracket and extending rearwardly therefrom. An air spring is mounted between the other end of each trailing arm and the vehicle frame. The trailing arms support a vehicle axle at rigid or semirigid connections with the trailing arms.

Raidel, in U.S. Pat. No. 4,465,298, issued Aug. 14, 1984, discloses a trailing arm suspension having a torque beam with two horizontally displaced members connected by a vertical member. The horizontal and vertical members are extruded hollow rectangular beams having varying dimensions in the various members. Although the beam appears to function properly, the extruded construction is relatively expensive and unnecessarily adds to the cost of the suspension.

Bird, in U.S. Pat. No. 3,547,215, issued Dec. 16, 1970, discloses a trailing arm suspension with a box-beam trailing arm comprising four plates, a top plate, bottom plate, and opposing side plates, welded together to form the trailing arm. Bird requires at least four longitudinal welds to assemble the beam portion of the trailing arm.

Wallace et at., in U.S. Pat. No. 4,858,949 issued Aug. 22, 1989, discloses a trailing arm suspension with a trailing arm having an I-beamlike construction. The I-beamlike construction requires that the trailing arm be cast or forged rather than fabricated from separate pieces.

SUMMARY OF INVENTION

The invention lies in a fabricated beam for use in a trailing arm suspension that is relatively simple in construction and inexpensive to assemble. The basic beam is formed of three pieces connected at two joints. A shock absorber bracket is integrally formed with the basic beam. A casting fixed in a preformed seat in the basic beam facilitates an axle connection with the beam.

In one aspect, the beam comprises a longitudinal rib having top and bottom edges. First and second side channel plates are disposed on opposite sides of the longitudinal rib. Each of the first and second side channel plates has top and bottom lateral walls and a bight portion. The top and bottom lateral walls of the first and second side channel plates have side channel plate edges. The longitudinal rib and the first and second side channel plates are connected by a top weld securing the first and second top side channel plate edges to the longitudinal rib top edge and a bottom weld securing the first and second bottom side channel plate edges to the longitudinal rib bottom edge.

Preferably, the top weld and the bottom welds are longitudinal. The first and second top side channel plate edges and the longitudinal rib top edge define a notch in which the top weld is disposed. Similarly the first and second bottom side channel plate edges and the longitudinal rib bottom edge can also define a notch in which the bottom weld is disposed. Generally, the longitudinal rib and first and second side channel plates are stamped from steel.

The beam has means for mounting an axle. Preferably, the axle mounting means comprises a seat in the beam in which is disposed a cast member having an aperture for mounting the axle. The beam also has a seat at one end of the beam in which is mounted a collar for pivotally mounting the beam to the vehicle frame. Generally, the longitudinal rib and the first and second channel plates are curved to form a curved beam. The other end of the beam mounts a shaft assembly to enable a transverse beam to connect trailing arms on opposite sides of the vehicle.

The longitudinal rib can have a portion with an aperture that extends beyond the first and second side channel plate edges to form a shock bracket.

In another aspect, the invention is directed to a trailing arm adapted for use in a trailing arm suspension wherein the trailing arm comprises first and second ends with the first end having means to pivotally mount the trailing arm to a vehicle frame and axle mounting means intermediate the first and second ends. The axle mounting means comprises a seat in the trailing arm and a cast member having an aperture complementary in shape to the shape of the seat and welded to the seat. Preferably, the seat is substantially U-shaped and the aperture is substantially circular. The cast member has a locating rib for positioning the cast member with respect to the trailing arm.

In yet another aspect of the invention, a trailing arm suspension comprises a trailing arm having first and second ends, the first end being pivotally mounted to the vehicle frame and the second end being mounted to the vehicle frame by a force dampening means for dampening forces imparted to the trailing arm suspension. The trailing arm comprises a longitudinal rib having top and bottom edges. First and second side channel plates having top and bottom lateral walls and a bight portion are welded to the longitudinal rib. The lateral walls of the first and second channel plates have edges. A top weld secures the first and second top lateral wall edges to the top longitudinal rib edge and a bottom weld secures the first and second bottom lateral wall edges to the bottom longitudinal rib edge.

BRIEF DESCRIPTION OF THE DRAWINGS

The invention will now be described with reference to the drawings wherein:

FIG. 3 is an elevational view of the trailing arm of FIG. 1 with parts cut away for clarity;

FIG. 4 is a top view of the trailing arm of FIG. 3;

DESCRIPTION OF THE PREFERRED EMBODIMENTS

Figure 1:
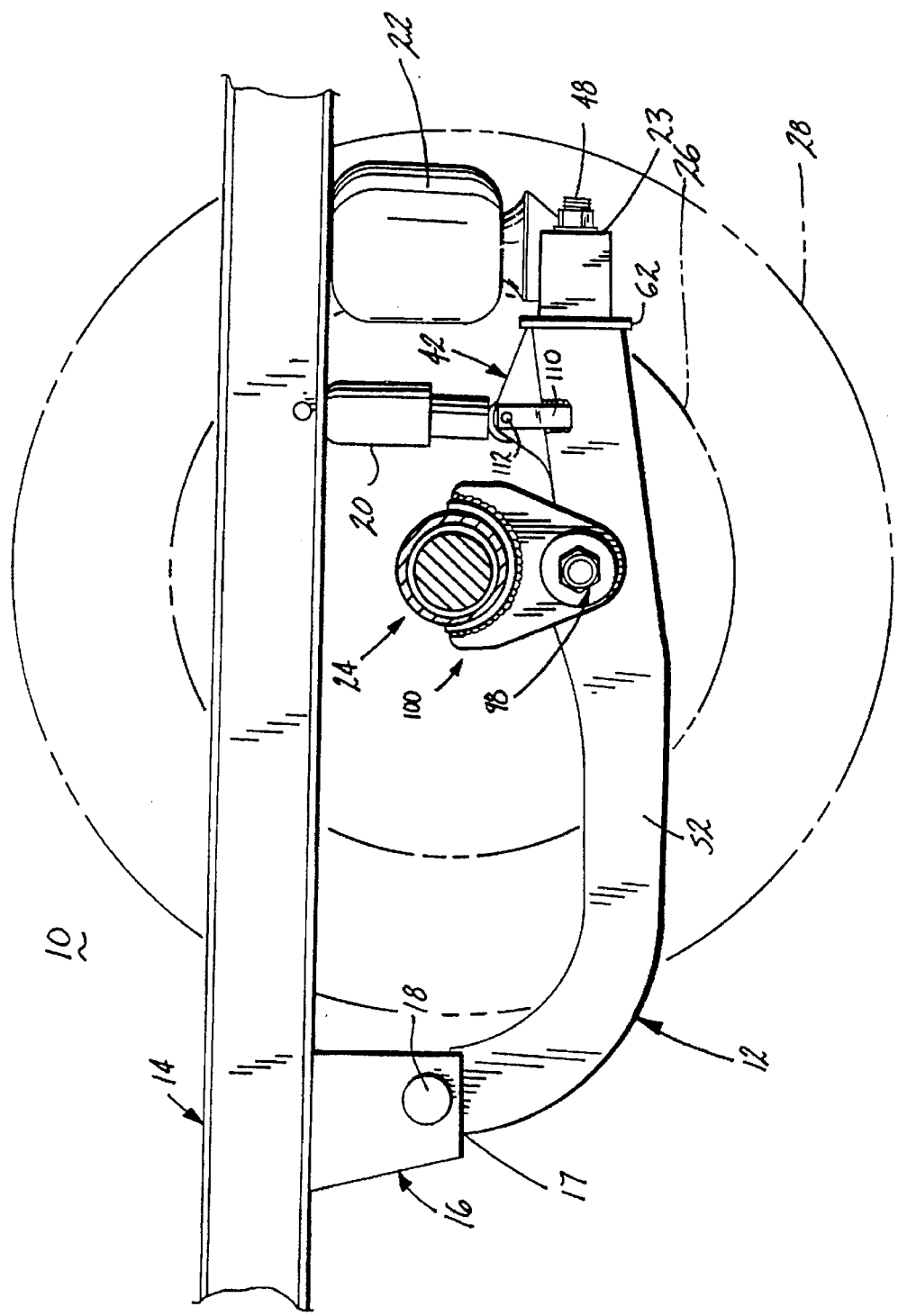
FIG. 1 is a plan view of a trailing arm suspension incorporating the trailing arm according to the invention.

FIG. 1 illustrates a vehicle having a trailing arm suspension 10 incorporating a trailing arm 12 according to the invention. A portion of a vehicle frame 14 is shown, with the front of the vehicle to the left in FIG. 1. The suspension 10 mounts the frame 14 to ground engaging wheels 26 and tires 28 (only one of which is shown in FIG. 1). It will be understood that a complete suspension 10 comprises a pair of trailing arms 12, one each mounted to opposite sides of the vehicle. For clarity, however, only one side of the vehicle is illustrated in FIG. 1.

The trailing arm 12 is pivotally mounted at one end 17 by a bushed connection 18 to a frame bracket assembly 16, which is rigidly fixed to the vehicle frame 14. The bushed connection 18 is commonly known in the art. The trailing arm 12 mounts an air spring assembly 22, either on the free end 23 of the trailing arm or an extension thereof. The upper portion of the air spring assembly 22 is secured to the frame 14 to enable the air spring to cushion the normal upward and downward movement of the frame when the vehicle is in motion. A shock absorber 20 extending between the trailing arm 12 and the vehicle frame 14 dampens the upward and downward motion. An axle 24 carrying the ground engaging wheels 26 and tires 28, is securely mounted to the trailing arm 12 intermediate the ends 17, 23.

Figure 2:
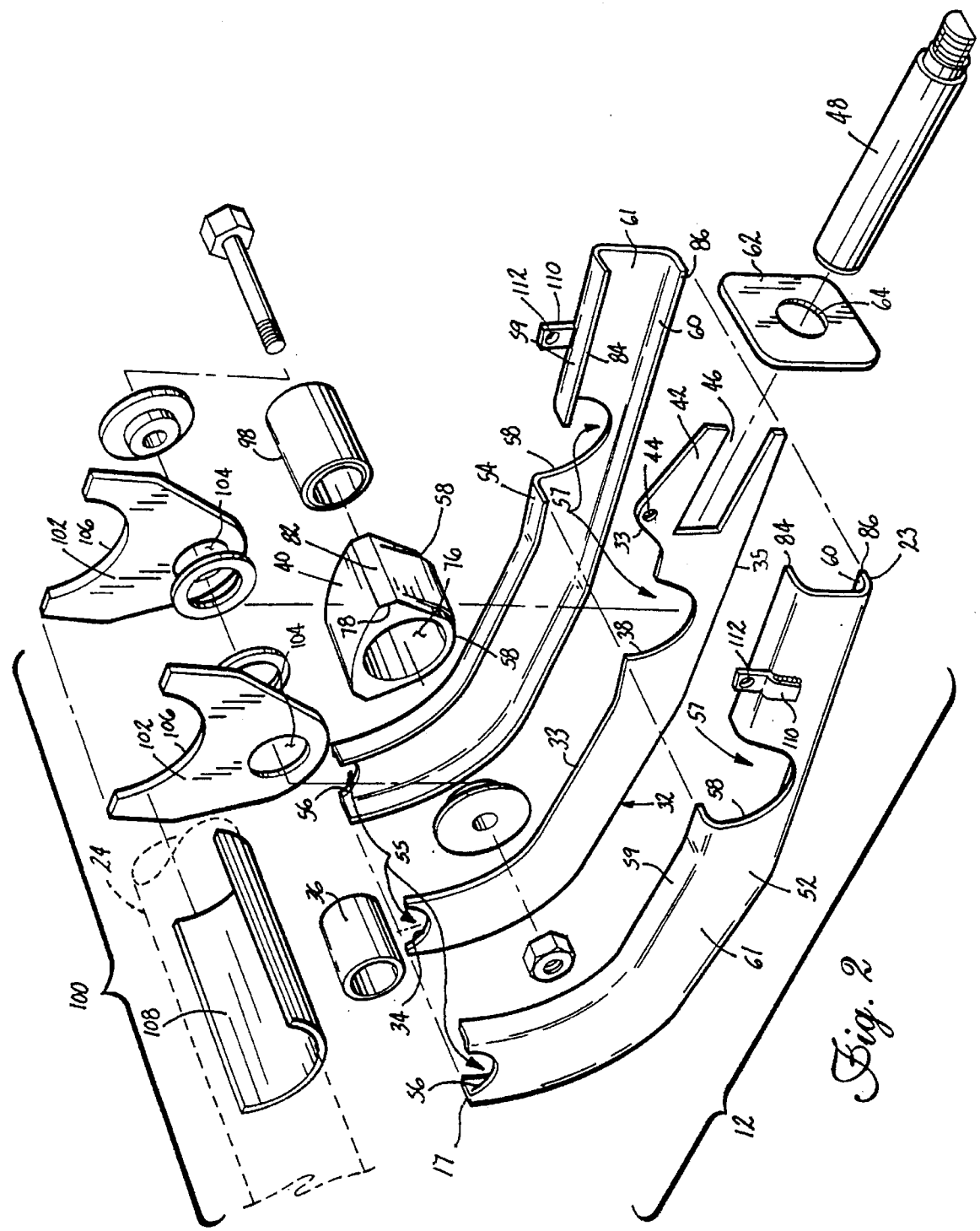
FIG. 2 is an exploded view of the trailing arm of FIG. 1.

Referring to FIGS. 1, 2 and 3, the trailing arm 12 is generally J-shaped in elevational profile, adapted to initially extend downwardly from the vehicle frame 14 and then extend rearwardly thereof. The J-shape of the trailing arm 12 provides one end of the trailing arm 12 for mounting to the vehicle frame 14 with a relatively short frame bracket 16 while maintaining a separation between the frame 14 and the free end 23 of the trailing arm 12 so that suspension members such as shock absorber 20 and air spring 22 can be mounted between the other end of the trailing arm 12 and the frame 14. One end 17 of the trailing arm 12 has a mounting collar 36 for receiving a bushing and pin to form the bushed connection 18 to mount the trailing arm 12 to the frame bracket assembly 16. The free end 23 of the trailing arm 12 mounts an end shaft 48, which is adapted to receive a complementary collar in a bushed connection for a transverse beam extending between the trailing arms on opposite sides of the vehicle in a manner well known in the art. The transverse beam resists torsional forces acting on the trailing arms, thereby providing some resistance to roll and sway. The transverse beam sometimes supports the air springs 22. A cast member 40 for mounting a bushed connection 98 that mounts axle 24 to the trailing arm 12 is mounted between the ends 17 and 23 of the trailing arm.

Figure 5:
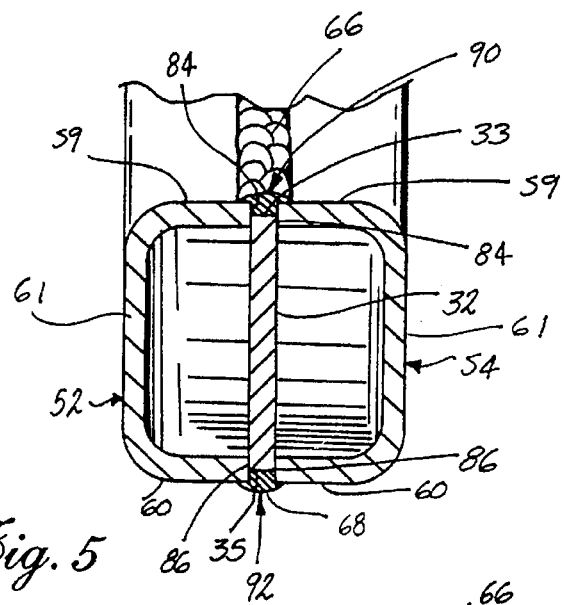
FIG. 5 is a sectional view taken along lines 5—5 of FIG. 3.

Referring specifically to FIGS. 2–4 and generally to FIG. 5, the trailing arm 12 comprises a central rib 32 that serves as the spine of the trailing arm 12. The central rib has a top edge 33 and a bottom edge 35 as best seen in FIGS. 2 and 5. The central rib 32 has a semicircular recess 34 in which the mounting collar 36 is received. An arcuate recess 38 located between the ends of the central rib receives the cast member 40. A shock bracket or extension 42 of the central rib 32 has a shock absorber opening 44 for mounting shock absorber 20. The other end of the central rib 32 adjacent the air spring 22 has a rectangular recess 46 for mounting the end shaft 48. The complexity of assembling the trailing arm suspension is reduced by integrating the shock absorber bracket 42 with the central rib 32 rather than attaching a separate shock absorber bracket after assembly of the trailing arm as done in prior trailing arm suspensions.

The trailing arm 12 also comprises side plates 52 and 54 which are channel-shaped, preferably being U-shaped in cross section. Other cross sections, such as a C-shape or a V-shape, for example, are suitable. The side plates 52 and 54 are welded to the central rib 32 by upper weld 66 and lower weld 68 to form a box beam with a central rib or spine. Although the welds 66 and 68 are illustrated as extending the longitudinal length of the central web 32, the welds 66 and 68 can be spot welded. The side plates 52 and 54 are mirror images of each other. Therefore, only one of the side plates will be described in detail. Side plate 52 has a top lateral wall 59 and a bottom lateral wall 60 connected by a bight portion 61. The top lateral wall 59 and bottom lateral wall 60 have a top edge 84 and a bottom edge 86, respectively. Side plate 52 has a semicircular recess 56, which is congruent in shape to the semicircular recess 34 of the central rib 32 for mounting the mounting collar 36. The semicircular recesses 34 and 56 of the central rib 32 and side plates 52, 54 form a first seat 55 for mounting the mounting collar 36. The mounting collar 36 is also welded to the central rib 32 and side plates 52 and 54 by welds 69 and 70.

Figure 7:
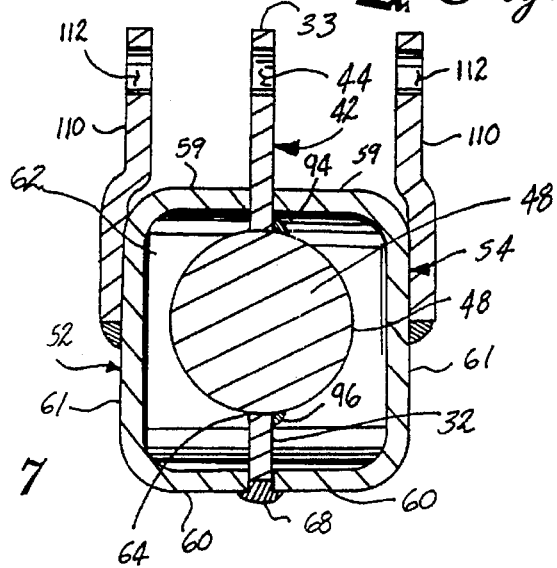
FIG. 7 is a sectional view taken along lines 7—7 of FIG. 3.

Preferably, at least one shock absorber mount plate 110 with aperture 112 is welded to one of the side plates 52 and 54. The shock absorber mount plate 110 cooperates with the shock absorber bracket 42 to form a clevis with which to mount a shock absorber. The side plate 52 or 54 to which the shock mount plate 110 is mounted depends on which side of the vehicle the trailing arm is disposed. Alternatively, shock mount plates 110 having apertures 112 can be mounted, preferably by welding, to both side plates 52 and 54 so that the trailing arm 12 can be used as a left or right hand trailing arm 12 (FIG. 7). In this manner, the trailing arm 12 is a universal trailing arm.

Figure 6:
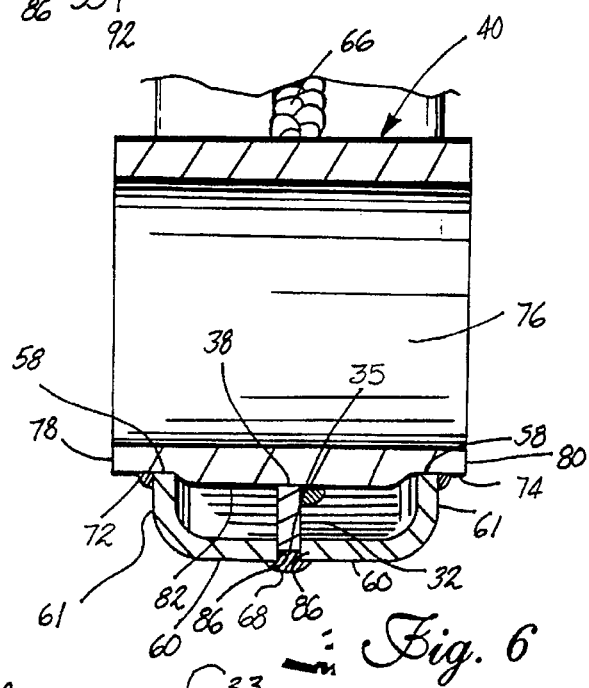
FIG. 6 is a sectional view taken along lines 6—6 of FIG. 3.

Referring now to FIGS. 2, 3 and 6, the side plate 52 also has an arcuate recess 58 that is congruent in shape to arcuate recess 38 of the central rib 32 for mounting the cast member 40 although not as deep as the arcuate recess 38. The arcuate recesses 38 and 58 of the central rib 32 and side plates 52, 54 form a second seat 57 for mounting the cast member 40. Preferably, the central rib 32 and the side plates 52, 54 are formed of stamped steel plate. The cast member 40 is generally tubular having a central aperture 76, and is preferably made from steel. The casting has reduced diameter portions 78 and 80 that define an alignment rib 82. The alignment rib 82 is disposed between the side plates 52 and 54 to align the cast member 40 within the trailing arm 12 and second seat 57. The cast member 40 is disposed within the arcuate recesses 38 and 58 with the reduced diameter portions 78, 80 resting in the recess 58 and the rib 82 resting in the recess 38. The cast member 40 is welded to the central rib 32 by a weld (not shown) and side plates 52 and 54 by welds 72 and 74. A bushed connection 98 is mounted within the aperture 76 of the cast member 40. The bushed connection 98 is common in the art.

Referring to FIG. 2, the axle 24 is mounted to the trailing arm 12 by axle bracket 100. Axle bracket 100 has opposing plates 102 that have an aperture 104 at one end to mount the plates 102 to the bushed connection 98. The other end of each plate has a conformed surface 106 which supports a seat 108 welded thereto. The axle 24 is mounted to the seat 108, preferably by welding.

Referring to FIGS. 2 and 6, an end plate 62 having an opening 64 for receiving the end shaft 48 is welded to the central rib 32 and side plates 52 and 54 by weld 65 to complete the trailing arm 12. It will be apparent that only three welds are needed to assemble the basic structure of the trailing arm 12, a significant reduction from the number required in prior fabricated trailing arms.

To assemble the trailing arm 12 according to the invention, the mounting collar 36, cast member 40, and end shaft 48 are mounted to the central web. The mounting collar 36 is placed within the semicircular recess 34 and preferably welded thereto. The cast member 40 is placed within the arcuate recess 38 and welded thereto. In a similar manner, the end shaft 48 is positioned within the rectangular recess 46 and welded to the central rib 32.

After the mounting collar 36, cast member 40, and end shaft 48 are mounted to the central rib 32, the side plates 52 and 54 are mounted to the central rib 32 by welds 66 and 68. Preferably, the plates 52, 54 are abutted against opposite sides of the central rib 32, but the central rib 32 is sufficiently shorter than the side plates 52, 54 so that a top notch 90 and a bottom notch 92 are formed by the top edges 33, 84 and bottom edges 35, 86 respectively. The welds 66 and 68 are laid in the top notch 90 and bottom notch 92, respectively. The side plates 52, 54 are then welded to the mounting collar 36 and cast member 40 by welds 69, 70 and 72, 74, respectively.

The end plate 62 is then pressed onto the end shaft 48 and welded to the central rib 32 and side plates 52, 54 by welds 65. Alternatively, the end plate 62 can be pressed onto the end shaft 48 prior to the welding of the end shaft 48 to the central rib 32.

The present invention greatly simplifies the assembly of the trailing arm 12. Other benefits include a lack of any required machining prior to or after assembly to form an aperture for receiving the axle 24 of the trailing arm suspension. Nor does a special shock absorber mounting bracket need be added to the trailing arm 12 after assembly because the center rib 32 has a shock absorber bracket 42 with opening 44 integrally formed with the central rib 32 for mounting shock absorber 20.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A beam (12) adapted for use as a trailing arm in a trailing arm suspension (10) and comprising:
   a longitudinal rib (32) having top (33) and bottom (35) edges;
   a first side plate (52) having top (59) and bottom (60) lateral walls terminating in first lateral wall edges (84, 86) and connected by a bight wall portion (61);
   a second side plate (54) having top (59) and bottom (60) lateral walls terminating in second lateral wall edges (84, 86) and connected by a bight wall portion (61);
   a top weld (66) securing the first and second top lateral wall edges to the top longitudinal rib edge; and
   a bottom weld (68) securing the first and second bottom lateral wall edges to the bottom longitudinal rib edge.

2. A beam (12) according to claim 1 wherein one of the top weld (66) and bottom weld (68) extends substantially the length of the longitudinal rib 32.

3. A beam (12) according to claim 2 wherein the other of the top (66) and bottom (68) weld extends substantially the length of the longitudinal rib 32.

4. A beam (12) according to claim 1 wherein the first and second top lateral wall edges (84) and the top longitudinal rib edge (33) define a notch (90) in which the top weld (66) is disposed.

5. A beam (12) according to claim 4 wherein the first and second bottom lateral wall edges (86) and the bottom longitudinal rib edge (35) define a second notch (92) in which the bottom weld (68) is disposed.

6. A beam (12) according to claim 1 wherein the first and second bottom lateral wall edges (86) and the bottom longitudinal rib edge (35) define a notch (92) in which the bottom weld (68) is disposed.

7. A beam (12) according to claim 1 wherein the longitudinal rib (32) is a steel stamping.

8. A beam (12) according to claim 1 wherein the longitudinal rib (32) and first and second side plates (52, 54) are curved in side elevation to form a curved beam.

9. A beam (12) according to claim 1 wherein the first and second side plates (52, 54) are steel.

10. A beam (12) according to claim 1 wherein the first and second side plates (52, 54) are C-shaped in cross section.

11. A beam (12) according to claim 1 further comprising axle mounting means (40, 57) for mounting an axle (24) to the beam.

12. A beam (12) according to claim 11 wherein the axle mounting means (40, 57) comprises a seat (57) in the beam and in which is disposed a cast member (40) having an aperture (76) for receiving an axle (24).

13. A beam (12) according to claim 1 wherein the beam (12) has a seat (55) at one end (17 or 23) thereof which is adapted to mount the one end of the beam to a frame member (14) of a vehicle.

14. A beam (12) according to claim 13 wherein the beam further comprises a collar (36) disposed in the seat (55), the collar having an aperture through which the beam can be pivotally mounted to the vehicle frame.

15. A beam (12) according to claim 1 further comprising a shaft assembly (48) mounted to the longitudinal rib (32).

16. A beam (12) according to claim 15 wherein the longitudinal rib (32) has a complementary recess (46) at one end and in which the shaft assembly (48) is mounted.

17. A beam (12) according to claim 1 wherein the longitudinal rib (32) has a portion (42) with an aperture (44) and which extends beyond the first and second top lateral wall edges (84) to form a shock bracket.

18. A beam (12) according to claim 1 further comprising an end plate (62) mounted to one end of the beam.

19. A beam (12) according to claim 18 wherein the end plate (62) has an aperture (64) and the beam further comprises a shaft assembly (48) extending through the aperture.

20. In a trailing am (12) adapted for use in a trailing arm suspension (10), the trailing arm comprising first and second ends (17, 23), the first end (17) having means (16, 17, 18, 36) to pivotally mount the trailing arm to a vehicle frame (14) and axle mounting means (40, 57) intermediate the first and second ends, the improvement in the axle mounting means comprising:
   a seat (57) in the trailing arm, and
   a cast member (40) having an aperture (76) therethrough wherein the cast member is complementary in shape to the shape of the seat and is welded to the seat.

21. A trailing arm (12) according to claim 20 wherein the seat is substantially U-shaped.

22. A trailing arm (12) according to claim 21 wherein the cast member (40) further comprises a locating rib (82) to position the cast member (40) with respect to the trailing arm (12).

23. A trailing arm (12) according to claim 22 wherein the trailing arm (12) is made from steel.

24. A trailing arm (12) according to claim 20 wherein the cast member (40) further comprises a locating rib (82) to position the cast member (40) with respect to the trailing arm (12).

25. In a trailing arm suspension (10) comprising a trailing arm (12) having first and second ends (17, 23), the first end adapted to pivotally mount to a vehicle frame (14) and the second end adapted to mount to the vehicle frame through a force dampening means (20, 22) for dampening forces imparted to the trailing arm suspension, and an axle mount (40, 57) adapted to mount an axle (24), the improvement in the trailing arm comprising:

- a longitudinal rib (32) having top and bottom edges (84, 86);
- a first side channel plate (54) having top and bottom lateral walls (59, 60) and a bight wall portion (61) extending therebetween;
- a second side channel plate (56) having top and bottom lateral walls (59, 60) and a bight wall portion (61) extending therebetween;

the lateral walls of the first and second side channel plates having edges (84, 86);

- a top weld (66) securing the first and second top lateral wall edges to the top longitudinal rib edge; and
- a bottom weld (68) securing the first and second bottom lateral wall edges to the bottom longitudinal rib edge.

26. A trailing arm suspension (10) according to claim 25 wherein the axle mount (40, 57) further comprises a seat (57) and the trailing arm (12) has a cast member (40) received in the seat.

27. A trailing arm suspension (10) according to claim 26 wherein the cast member (40) further comprises a locating rib (82) to position the cast member (40) with respect to the trailing arm (12).

* * * * *